Dec. 18, 1951     N. H. GODLEY     2,579,041
HAY RAKE
Filed Aug. 6, 1949     4 Sheets-Sheet 1
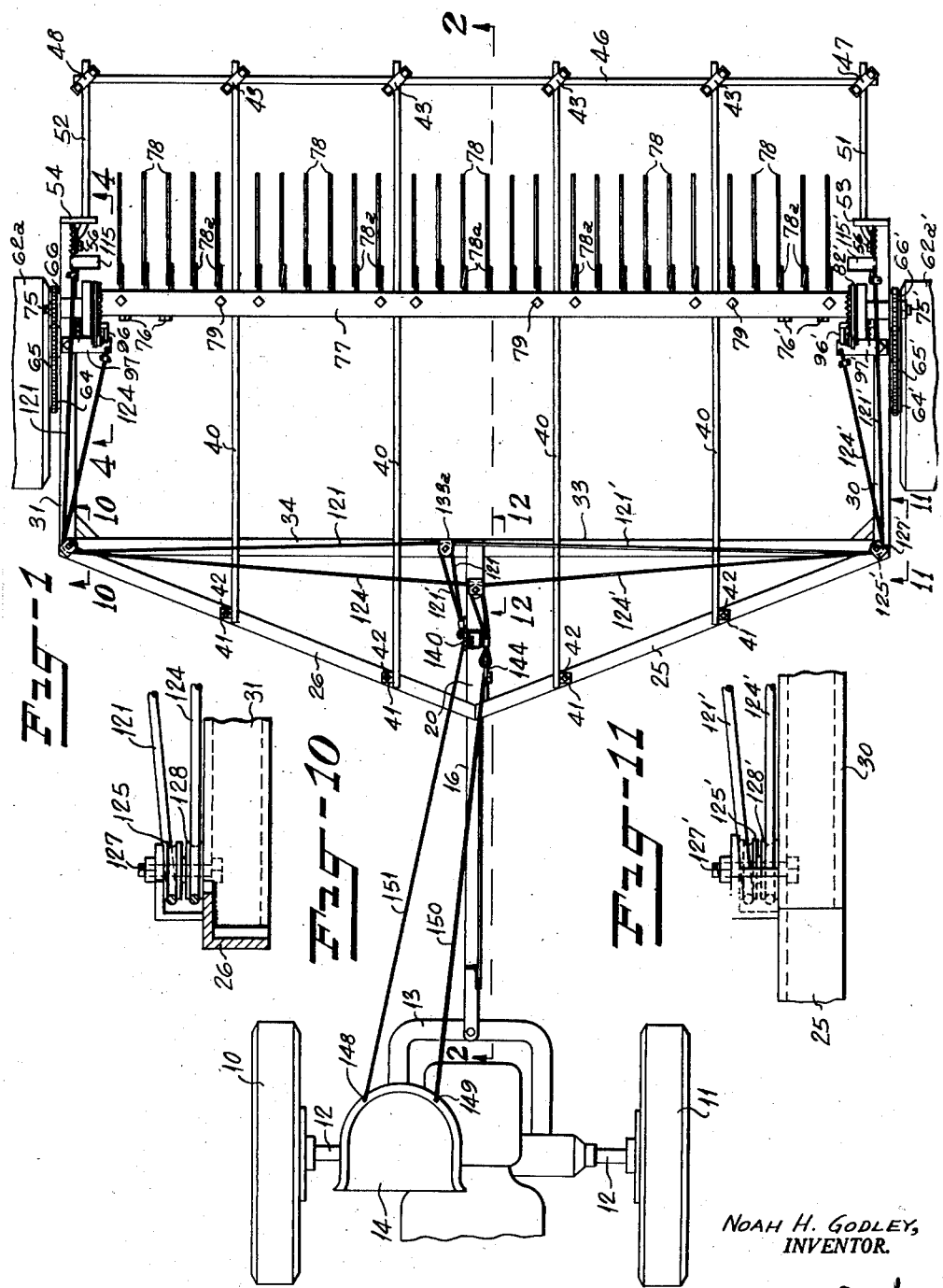
NOAH H. GODLEY,
INVENTOR.
BY
ATTORNEY

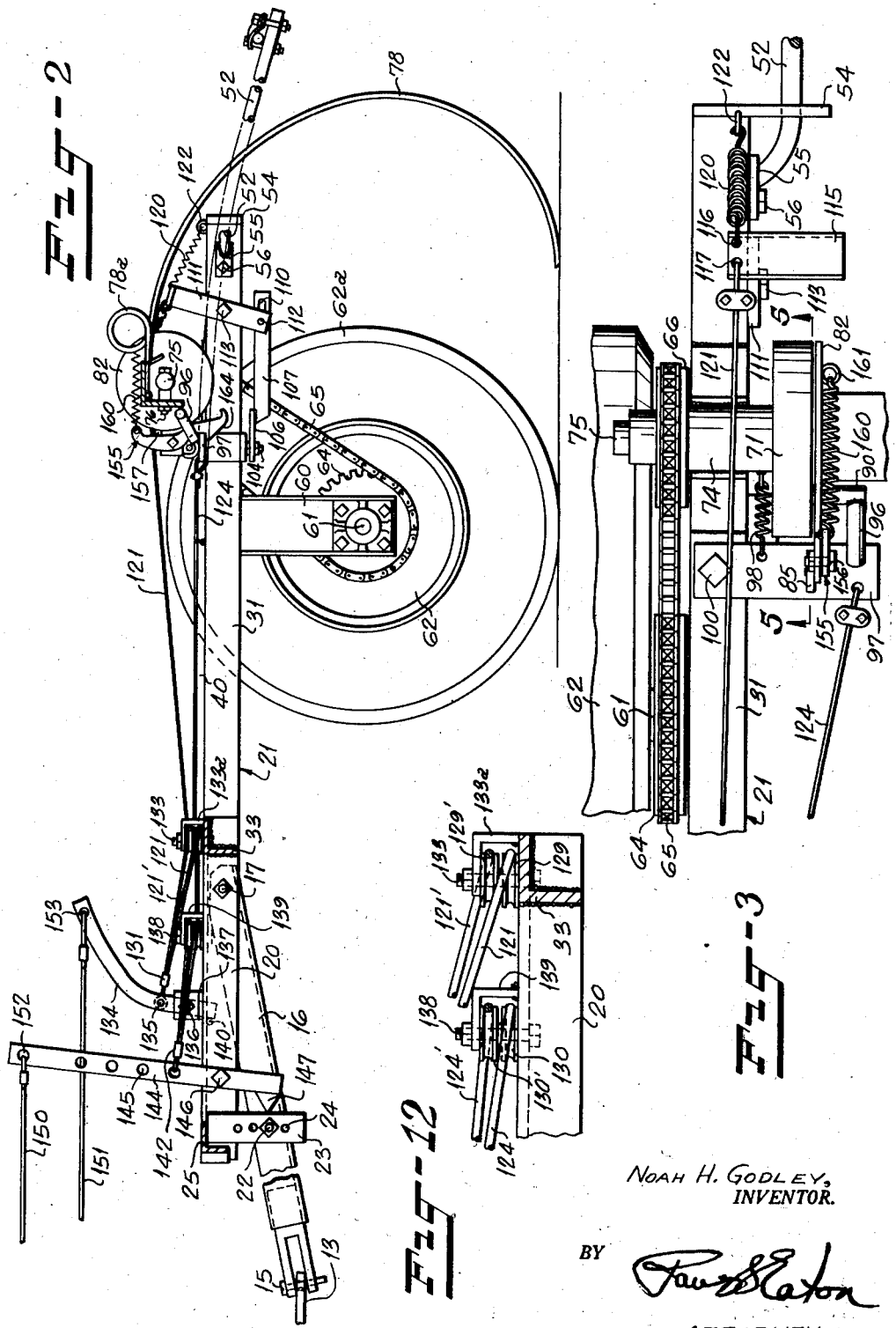

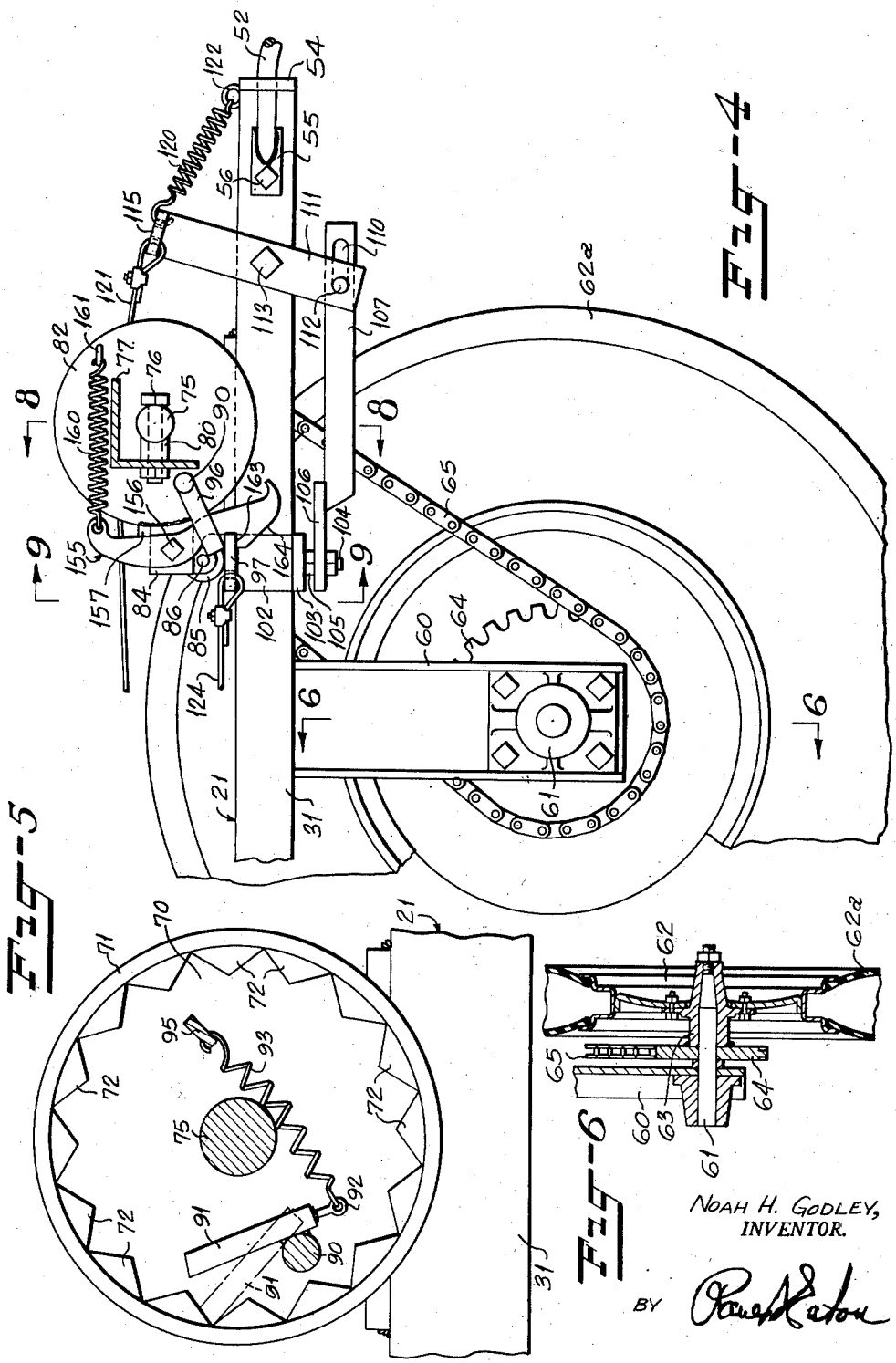

Dec. 18, 1951 N. H. GODLEY 2,579,041
HAY RAKE
Filed Aug. 6, 1949 4 Sheets-Sheet 4
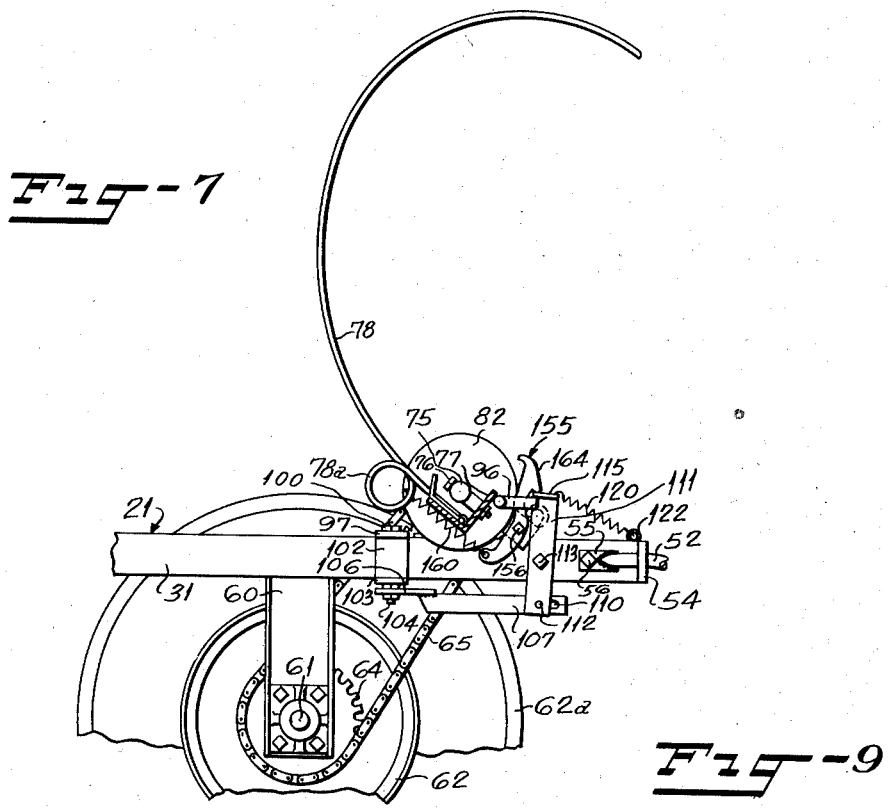
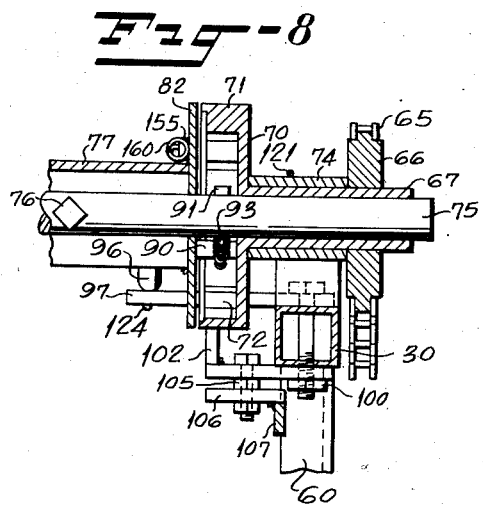
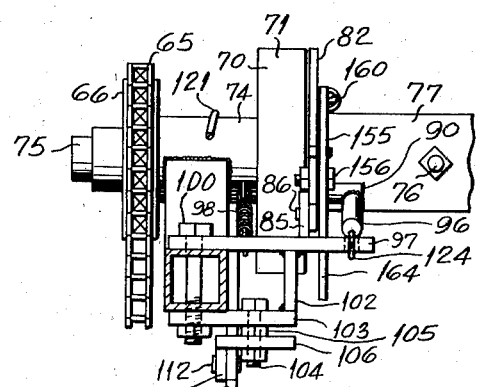
NOAH H. GODLEY,
INVENTOR.
BY
ATTORNEY Patented Dec. 18, 1951

2,579,041

UNITED STATES PATENT OFFICE 2,579,041

HAYRAKE

Noah H. Godley, Charlotte, N. C.

Application August 6, 1949, Serial No. 108,912

4 Claims. (Cl. 56—391)

This invention relates to improvements in a hay rake having a wheeled frame provided with a rotatable tine frame with rearwardly and downwardly and forwardly curved tines thereon, the hay rake embodying manually controlled means driven by the ground wheels of the rake for rotating the tine frame a complete revolution, and whereby the tines are drawn clear of the hay collected thereon, at each dumping operation.

This invention is a continuation in part of my copending application entitled Hayrake, Serial Number 46,397, filed August 27, 1948, now Patent No. 2,521,909, granted September 12, 1950.

The hay rake shown and described in said copending application includes a wheeled framework adapted to be pulled by any suitable means such as a tractor and having a transverse rotatable bar thereon which supports a plurality of spaced tines. The tines are adapted to rest in a lowered position during a raking operation and manually controlled means are provided for revolving the tines for a dumping operation. The means in this application for restricting movement of the tines to approximately one-half revolution to where the tines will remain in a raised position for transporting the rake from one location to another are different from the means for performing the same function in said co-pending application.

It is an object of the present invention to provide a spring loaded locking member adjacent opposed ends of the transverse bar, heretofore described, which is adapted to engage a manually operable member which is a part of the said manually controlled means heretofore described for holding the transverse bar with its associated tines in a fixed lowered position to thus prevent the tines from bouncing along the ground as the rake is pulled along during a raking operation. This locking means lends rigidity to the tine supporting bar while the tines are in a lowered position.

It is another object of this invention to provide manually controlled means adapted to be moved into the path of travel of the said locking members, on opposed ends of the rotatable transverse bar and which means, when projected into the path of travel of the locking member, will cause the locking member to engage the same to thus hold the transverse bar with its associated tines in a raised position for transporting the rake from one place to another.

Some of the objects of the invention having been stated, other objects will appear as the description proceeds, when taken in connection with the accompanying drawings, in which—

Figure 1 is a top plan view of the rake and showing a portion of a tractor to which the rake is adapted to be connected;

Figure 2 is an enlarged elevation with a part of the draw bar of the hay rake broken away and with other parts in section and is taken along the line 2—2 in Figure 1;

Figure 3 is an enlarged top plan view of the structure shown in Figure 1 adjacent the uppermost ground wheel;

Figure 4 is an enlarged fragmentary elevation with the transverse rotatable bar in cross-section and is taken along the line 4—4 in Figure 1;

Figure 5 is an enlarged elevation showing a part of the clutch mechanism and with parts in section and is taken substantially along the line 5—5 in Figure 3;

Figure 6 is a vertical sectional view taken substantially along the line 6—6 in Figure 4, but showing the parts on a reduced scale;

Figure 7 is a fragmentary elevation with parts in section showing the upper central portion of Figure 2, but with the tines in a raised position;

Figure 8 is a vertical sectional view taken substantially along the line 8—8 in Figure 4;

Figure 9 is an elevation with parts in section and is taken substantially along the line 9—9 in Figure 4;

Figure 10 is an elevation, with parts in section and is taken along the line 10—10 in Figure 1;

Figure 11 is an elevation taken along the line 11—11 in Figure 1;

Figure 12 is an elevation with parts in section and is taken along the line 12—12 in Figure 1.

Referring more specifically to the drawings, there is shown in Figure 1 the rear portion of a conventional tractor having ground wheels 10 and 11 mounted on opposed ends of a rear axle 12 to which a U-shaped draw bar 13 is secured in a conventional manner. The tractor also has a seat 14 thereon. Pivotally connected, as at 15 to the U-shaped draw bar 13, is the front end of a rearwardly extending draw bar 16 which is pivotally connected at its rearmost end, as at 17, to a forwardly and rearwardly extending intermediate frame member 20 of a substantially rectangular frame of the hay rake, broadly designated at 21.

Forwardly of its pivot point 17, the bar 16 is adjustably secured, as by a bolt 22, to a vertically disposed plate 23. The plate 23 has a plurality of holes 24 therein which are adapted to be penetrated by the bolt 22 for adjustably securing the bar 16, as to angularity to the plate 23.

The upper end of the plate 23 is secured by any suitable means, such as spot welding, near the front end of the intermediate frame member 20. The front ends of rearwardly diverging angle bars 25 and 26 are welded to the front end of the frame member 20. The remote ends of the angle bars 25 and 26 are welded to rearwardly extending side bars 30 and 31, respectively, which are preferably rectangular and tubular in cross-section.

Two alined angle bars 33 and 34 span the distance between the side bars 30 and 31 and the proximate ends of the angle bars 33 and 34 are welded to the opposite sides of the intermediate frame member 20 at its rear end in Figure 1. The remote ends of the angle bars 33 and 34 are welded at the juncture of the angle bars 25 and 26 with the tubular side bars 30 and 31. A plurality of spaced longitudinally extending rods 40 are mounted between the longitudinally extending tubular bars 30 and 31 and the front ends of the rods 40 are welded to blocks 41 which are penetrated by screws 42 for securing the front ends of the rods 40 to the angle bars 25 and 26.

The rods 40 extend rearwardly from the angle bars 25 and 26 and rest intermediate their ends on the angle bars 33 and 34 and then extend rearwardly and are clampingly secured as at 43 to an interconnecting transverse rod 46. Opposed ends of the transverse rod 46 are clampingly secured as at 47 and 48 to the rear ends of bars or rods 51 and 52, respectively. These bars 51 and 52 extend forwardly and upwardly at a slight angle and then curve outwardly at the front ends thereof as they penetrate plates 53 and 54 welded to the rearmost ends of the tubular side bars 30 and 31, respectively. The foremost ends of the rods 51 and 52 are then secured as by welding to plates 55 (Figures 2 and 4) which are penetrated by screws 56 for securing the front ends of the rods 52 to the tubular side bars 30 and 31. The intermediate longitudinally extending rods 40 and the endmost rods 51 and 52, all of which are interconnected by the transverse rod 46 are provided to serve as means for separating the hay from the tines, to be later described, as the tines pass by the same in a dumping operation.

Welded to the lower surfaces of the tubular side bars 30 and 31, intermediate the ends thereof, are downwardly extending channel bars 60 and 60', respectively, and since the bars 60 and parts associated therewith are identical to the bar 60' and parts associated therewith, except being opposite hand, like reference characters shall apply to the parts associated with the bar 60' as those associated with the bar 60 with the prime notation added.

The bar 60 has a stub axle 61 fixedly mounted therein. The stub axle 61 has a ground wheel 62 rotatably mounted thereon which has a hub portion 63 integral therewith and disposed on the inner side thereof in Figure 6. The ground wheels have pneumatic casings 62a mounted thereon. A sprocket wheel 64 is welded to the inner surface of the hub portion 63 of the ground wheel 62 adjacent the bar 60.

The sprocket wheel 64 has a sprocket chain 65 mounted thereon which extends upwardly and rearwardly and is mounted on a sprocket wheel 66 (Figures 3, 8, and 9). The sprocket wheel 66 is secured, as by welding, to a tubular hub portion 67 (Figure 8) of a disk 70 having an annular portion or ring 71 on the inner face thereof. By referring to Figure 5 it will be observed that the annular portion 71 has a plurality of teeth 72 cut in the internal periphery thereof. The tubular hub portion 67 of the disk 70 is rotatably mounted in a bearing block 74 secured, as by welding, to the tubular side bar 31. Likewise, the tubular hub portion 67' of the disk 70' is rotatably mounted in the bearing block 74' which is secured to the tubular frame member 30.

It will be observed in Figures 4 and 8 that there is a stub shaft 75 rotatably mounted in the tubular hub portion 67 of the disk 70 and, obviously, a stub shaft 75' would be rotatably mounted within the tubular portion 67' of the disk 70'. This shaft 75 is secured as by bolts 76 to a transverse tine frame angle bar 77. It will be noted in Figure 4 that the shaft 75 is held in spaced relation to the angle bar 77 by suitable sleeves 80 which are penetrated by the bolts 76. The opposite ends of the angle bar 77 terminate adjacent the proximate sides of the annular ring portions 71, 71' of the disks 70, 70' and have dog carrying disks 82 and 82' welded to the ends thereof (Figures 1, 4, 8 and 9). Suitable tines 78 having a coil 78a therein are secured to the angle bar 77 by means of bolts 79.

The disks 82 and 82' are penetrated by the shaft 75 and, in Figure 4, the disk 82 has a forwardly projecting portion 84 extending from the periphery thereof, and which may be welded thereto, if desired, and this forwardly projecting portion 84 has a stop in the form of a roller 85 rotatably mounted thereon as at 86. Mounted in the disk 82 in Figures 4 and 5 is an oscillatable shaft 90 which extends outwardly and its outer end is disposed in the same vertical plane as the teeth 72 on the inner periphery of the annular portion 71. The oscillatable shaft 90 has a dog 91 welded thereto (Figure 5), the free end of which is adapted to engage the teeth 72 on the interior of the annular ring portion 71, as desired, for transmitting rotation to the tines 78 along with the transverse angle bar 77 in a dumping operation to be later described. The portion 71 and its teeth 72 and dog carrying disk 82 and its dog 91 with the shaft 90 may be broadly referred to as a clutch or clutch means.

The opposite end of the dog 91 has a suitable spring anchor 92 extending therefrom to which one end of a tension spring 93 is connected, the other end of the tension spring 93 being connected to a spring anchor 95 projecting from the proximate face of the disk 70. The shaft 90 projects inwardly through the disk 82 and its inner end has a finger 96 welded thereto, which projects forwardly when the tines 78 are in a lowered position; that is, when the parts are in the position shown in Figures 2 and 4.

It will be noted that when the parts are in the position shown in Figures 2 and 4, the fingers 96 and 96' and the stop rollers 85 on the projecting portions 84 and 84' are adapted to engage horizontally disposed stop plates 97 and 97'. The stop plate 97 is urged rearwardly by a tension spring 98 conected thereto, the other end of which spring is connected to the bearing member 74.

The horizontally disposed stop plates 97 and 97' are pivotally secured, as by bolts 100 and 100', to the upper surfaces of the side frame members 30 and 31. As previously stated, the parts on both sides of the machine are the same except being opposite hand with the parts at the left-hand or lower side of the machine in Figure 1 bearing the prime notation.

Now, by referring to Figures 4, 7, 8 and 9, it will be observed that the plate 97 has the upper edge of a vertically disposed bracing plate 102 welded thereto, the lower edge of which is welded to the inner end of a horizontally disposed plate member 103 which is parallel to the plate member 97 and extends inwardly, and which is also loosely penetrated by the bolt 100. The parallel plate member 103 is slidably penetrated intermediate its ends by a bolt 104 having a spacer sleeve 105 thereon the lower edge of which is engaged by a horizontally disposed plate member 106. The horizontally disposed plate member 106 has the front end of a bar 107 welded thereto which extends rearwardly and has a longitudinally extending slot 110 therein (Figure 4). The parts 102 to 110, inclusive, are parts of the present invention which also comprises a pivoted bar 111 which has a pin 112 projecting outwardly therefrom in Figure 9 and which has longitudinal sliding movement in the slot 110 of the bar 107 to assist in guiding the pivoted bar 111. The bar 111 is oscillatably mounted intermediate its ends, as at 113, on the inner surface of the longitudinally extending side frame member 31. The bar 111' is oscillatably secured to the inner surface of the longitudinally extending tubular frame member 30 in a manner identical to that in which the pivoted bar 111 is oscillatably secured to the inner surface of the longitudinally extending tubular frame member 31.

The upper end of the bar 111 in Figure 4 is welded intermediate the ends of a transverse bar 115 having suitable holes 116 and 117 therein (Figures 3 and 4) to which the front and rear ends of a tension spring 120 and a cable 121, respectively, are secured. The tension spring 120 extends rearwardly and downwardly at an angle (Figure 3) and its rear end is connected to a suitable spring anchor 122 projecting from the upper surface of the longitudinally extending side frame member 31 to thus normally urge the upper end of the bar 111 rearwardly in Figure 4.

The plate members 97 and 97' have connected to their free ends the rear ends of suitable cables 124 and 124', respectively, and, it will be observed in Figure 1, that the cables 121 and 121' extend forwardly and pass partially around pulleys 125 and 125', respectively, and cables 124 and 124' also extend forwardly and pass partially around pulleys 128 and 128'. The pulleys 125 and 128 are rotatably mounted as at 127, and pulleys 125' and 128' are rotatably mounted as at 127'. The cables 121 and 121' then extend inwardly towards each other and partially pass around pulleys 129 and 129' mounted on a bolt 133 mounted in a bracket 133a. The cables 124 and 124', after passing pulleys 128 and 128', then extend inwardly toward each other and pass partially around suitable pulleys 130 and 130' rotatably mounted on a bolt 138 mounted in a bracket 139 (Figure 12). The cables 121 and 121' then extend forwardly and are suitably connected, as at 131 (Figure 2), to a common eye member 132 pivotally connected intermediate the ends of a transport lever 134, as at 135.

The cables 124 and 124', after passing pulleys 130 and 130' (Figure 1), extend forwardly and upwardly at an angle in Figure 2 and are connected to a dumping lever 144. This lever 144 has a plurality of vertically spaced bores 145 therein, any one of which may be employed for receiving the clip 142.

The lever 134 is oscillatably mounted, as at 136, on an angle clip 137 secured, as by welding, to the upper surface of the intermediate frame member 20 (Figure 2). This intermediate frame member has a stop pin 140 projecting therefrom against which the lower end of the lever 134 is adapted to bear under the backward pull of the tension springs 120 and 120' associated with the stop plate members 115 and 115', respectively.

The dumping lever 144 is oscillatably mounted intermediate its ends, as at 146, on the longitudinally extending frame member 20 of the rake frame 21. This lever 144 extends downwardly (Figure 2) and has a bumper 147 integral therewith which is adapted to normally be held against the rear surface of the vertically disposed plate member 23 previously described by the tension in springs 98 and 98'. The upper end of the dumping lever 144 (Figure 2), as well as the upper end of the transport lever 134, have control cables 150 and 151, respectively, suitably connected thereto, as at 152 and 153. These control cables 150 and 151 extend forwardly from the hay rake frame 21 and may be connected to the rear portion of the tractor at any point where they will be within easy reach of the operator thereof and, in this instance, they are shown tied to the rear portion of the seat 14, as at 148 and 149, respectively.

The transport lever 134 is normally held in the position shown in Figure 2 by means of the springs 120 and 120' (Figure 3). Due to the curvature of lever 134, when it is pulled fully forward, while the hand of the operator lowers the front end of the cable 151, to where its free end is in a straight line extending from point 149 to pivot point 136; this will cause point 135 to be disposed below a horizontal plane passing through pivot point 136 of the lever 134, to thus releasably lock lever 134 in fully forward position. The full forward position of lever 134 is maintained before and while the tines are in the position shown in Figure 7.

*Improved locking device*

In the drawings there is shown an improved locking device associated with each of the disks 82 and 82', this locking device being identical at both sides of the hay rake and only the locking device at the upper side thereof in Figure 1 will be described, the device at the other side thereof where shown, bearing the same reference characters with the prime notation added. In Figures 2, 3, 4, 7 and 9, the locking device is more clearly shown and comprises an irregularly shaped locking dog 155 oscillatably mounted intermediate its ends, as at 156, on the forwardly projecting portion 84 of the dog carrying disk 82. The disk 82 has an inwardly projecting stop pin 157 welded thereto at its juncture with the portion 84 and against which the upper portion of the dog 155 of the locking device is urged by a tension spring 160, opposed ends of which are connected to the upper end of the dog 155 and to a spring anchor 161 projecting from the disk 82.

The dog 155 of the locking device extends downwardly from its pivot point 156, in Figure 4, and curves rearwardly and then extends downwardly and has a lug 163 integral therewith defining a notch into which the stop plate 97 is normally urged by the tension spring 98 for locking the transversely disposed angle bar to hold the tines in a lowered or operative position such as that shown in Figure 2. The lower end of the dog 155 in Figure 4 is provided with an angularly cut cam surface 164 which, upon rotation of the disk 82, will engage the stop plate 97 thus urging the lower end of the dog 155 rearwardly until the stop plate 97 engages the notch defined by the lug 163. It will be noted that this lug 163 is spaced in a horizontal plane a substantial distance below the lower surface of the roller 85 so the roller 85 will engage the upper surface of the stop plate 97 as the lug 163 engages the lower surface thereof.

*Method of operation*

Assuming that the tractor and the rake in Figure 1 are moving from right to left and that the movable parts are in the operating position shown in Figures 2 and 4, and also that the tines 78 have picked up a sufficient amount of hay to warrant a dumping operation, the cable 150 is grasped by the operator of the tractor and is momentarily pulled forwardly or from right to left in Figures 1 and 2 and then released. This will move the dumping lever 144 in a counterclockwise direction in Figure 2, whereby the cables 124 and 124' connected thereto will move the horizontally disposed stop plates 97 and 97' forwardly in Figure 1.

Now, as the plates 97 and 97' move forwardly (Figures 1, 3 and 4), this will permit the free end of the finger 96 to move downwardly due to the tension spring 93 in Figure 5 and will, consequently, partially rotate the oscillatable shaft 90 having the dog 91 on the end thereof within the annular ring portion 71 of the disk 70. As the stub shaft 90 partially rotates in a counterclockwise direction in Figure 5, the dog 91 is moved from the solid line to the dotted line position shown in Figure 5. Now, inasmuch as the ground wheel 62 is rotating, rotation will be imparted through the sprocket wheels 64 and 66 and the sprocket chain 65 to the disk 70 at all times while the rake is in motion, thus causing the annular ring portion 71 to rotate in a counterclockwise direction in Figure 5.

As the free end of the dog 91 engages one of the teeth 72 in the annular ring portion 71, rotation of the annular ring 71 will cause the shaft 90 to turn about the axis of the shaft 75 which will, in turn, cause the disk 82 to rotate with the disk 70 whenever the dog 91 is in engagement with one of the teeth 72 of the disk 70 in Figure 5.

The transverse angle bar 77, on which the tines 78 are mounted, will thus be caused to rotate in a counterclockwise direction in Figures 2 and 4 along with the tines 78. This will, of course, withdraw the tines from the hay that has been collected by the same and the longitudinally extending intermediate rods 40, as well as the end bars 51 and 52, will assist in wiping the hay from the tines 78 as they pass thereby.

Due to the pressure of any one of the teeth 72 against the free end of the dog 91, in Figure 5, during rotation of the transverse angle bar 77 and associated parts, the dog 91 will remain in engagement with a particular tooth 72 until a revolution of the same has been completed, at which time the free end of the fingers 96 and 96' will again engage the top surfaces of the stop plates 97 and 97'. It is to be understood that the cable 150 will have been released by the operator immediately upon rotation of the transverse angle bar 77 having started. It is manifest that upon the cable 150 being released, the tension spring 98, associated with the plate 97, will cause the same to move rearwardly at its free end to thus enter the path of travel of the free end of the finger 96.

Immediately before the finger 96 engages the stop plate 97 in Figure 4, the cam surface 164 of the locking dog 155 will engage the plate 97 and, with continued movement of the disk 82 in a counterclockwise direction in Figure 4, the finger or dog 96 along with its oscillatable shaft 90 will partially rotate in a clockwise direction and thereby move the finger or dog 91 (Figure 5) out of engagement with the teeth 72 of the disk 70. As this dog 91 is moved out of engagement with the teeth 72, the lug 163 of the locking dog 155 in Figure 4 is moved into engagement with the lower surface of the stop plate 97 at the same time that the roller 85 moves into engagement with the upper surface of the plate 97, thus restricting further rotation of the disk 82 as well as the transverse angle bar 77 and its tines 78 to again permit the tines 78 to collect another portion of hay.

Now, when it is desired to arrest rotation of the transverse angle bar 77 with its associated tines 78 in an elevated position, such as that shown in Figure 7, for transporting the rake from one location to another, both of the cables 150 and 151 may be pulled forwardly by the operator, and it has already been stated how the dog 91 will be moved into engagement with the teeth 72 of the disk 71 to initiate rotation of the angle bar 77 and its tines 78.

Now, since the cable 151 has also been pulled forwardly by the operator, the cables 121 and 121' will likewise move forwardly thus transmitting partial rotation to the pivoted bars 111 and 111'.

This will cause the bar 111 (Figure 4) to move forwardly at its upper end to substantially the position shown in Figure 7 as a result of which the plate 115 at the upper end of the pivoted bar 111 will be disposed in the path of travel of the free end of the finger 96 as well as the cam surface 164 on the locking dog 155. It will be noted in Figure 2 that forward movement of the upper end of lever 144 is restricted by the upper rear corner of plate 23 being engaged by a medial portion of the lever 144. This allows the lever 144 to move far enough however, to restrict movement of the bar 111 due to the rear wall of the slot 110 engaging pin 112, as the bar 107 is moved forwardly, so the bar 111 will not be engaged by the forward end of the locking dog 155 (Figures 4 and 9) in such a manner as to damage the parts in attempting to prevent further rotation of the tine supporting angle bar 77.

The finger 96 will, of course, engage the lower surface of the plate 115, as the disk 82 and angle bar 77 rotate in a counterclockwise direction from the position shown in Figures 2 and 4 to a point just short of the position shown in Figure 7, which will cause the stub shaft 90 to again partially rotate in a clockwise direction and will move its associated dog 91 out of engagement with a particular tooth 72 in the annular ring portion 71 of the disk 70. In other words, the plate 115, at the upper end of the angle bar 111 will affect the finger 96 and the locking dog 155 in a manner identical to that of the plate 97.

As shown in Figure 7, after the dog 91 has been released from engagement with the teeth 72 in the disk 70 the lug portion 163 of the locking dog 155 will bear against the upper surface of the plate 115 and the roller 85 on the projection 84 of the disk 82 will be moved to a position immediately below the lower surface of the plate 115 at the upper end of the lever arm 111. It is thus seen that the lug 163, on the locking dog 155, and the roller 85 will prevent further movement of the transverse bar 77, on which the tines 78 are mounted, in either direction. To lock the bar in forward position, the cable 151 will be depressed as it is pulled forwardly to cause point 135 to be in a plane lower than pivot point 136.

Now, when the operator desires to again lower the tines 78 from the transport position shown in Figure 7 to the operating position shown in Figure 2, he releases the lever 134 by an upward pull on cable 151 to allow it to return to the position shown in Figure 2, and since the bar 77 and tines 78 are balanced in the inoperative position shown in Figure 7, the tension spring 120 will transmit partial clockwise movement to the bar 111, in Figure 4, to cause the pin 112 to engage the front wall of the slot 110 in the bar 107 or to move closely adjacent the same.

It is manifest that this will release the lug 163 of the dog 155 from engagement with the plate 115 in the upper end of the bar 111 in Figure 4 and the tines 78 will thus move forwardly at their upper ends in Figure 7, by virtue of the dog 91 again engaging one of the teeth 73 in the annular ring portion 71 of disk 70, and will then move to the position shown in Figure 2 where the dog 91 will again move out of engagement with the teeth 73 in the manner earlier described.

When the tines have moved forwardly of the position shown in Figure 7, they may fall to operating position at a much faster rate than the speed of disk 70 because the dog 91 will override the teeth 72 (Figure 5). This overriding of dog 91 will permit the rake to be moved backwards without turning the angle bar 77 with its tines 78.

In the drawings and specification there has been set forth a preferred embodiment of the invention, and although specific terms are employed, they are used in a generic and descriptive sense only, and not for purposes of limitation, the scope of the invention being defined in the claims.

I claim:

1. An improvement in a hay rake having a rectangular frame provided with a pair of ground wheels disposed adjacent the side portions thereof, and having a rotatable shaft on each side of the frame and each shaft having a sleeve rotatably secured thereon and provided with a disk having an internal gear and a bearing on each side of the frame for the sleeves and having a tine frame secured on the proximate ends of said shafts, said tine frame having a pair of disks fixedly secured on the ends thereof and being disposed adjacent the disks having the internal gears therein, each of said disks on the tine frame being provided with an oscillatable shaft having a dog on one end thereof and disposed in the same vertical plane as the internal gear and tension means urging the free end of the dog into engagement with the internal gear, and a finger disposed on the other side of the last-named disks, the improvement comprising a pair of oscillatable stop plates normally held in the path of the finger on the exterior of the last-named disk, manually operable means for moving the oscillatable members out of the path of the finger portion, each of said last-named disks having mounted thereon a locking dog provided with a cam surface adapted to ride by the oscillatable means and having a hook portion for engaging the lower edge of the oscillatable means and said disk having a roller thereon for engaging the top surface of the oscillatable means, and a second oscillatable member disposed rearwardly of the disks, and manually operable means for moving the second oscillatable member into the path of the cam surface of the locking dog and also into the path of the finger, whereby the tine frame upon making a partial revolution will cause the cam surface of the locking dog to ride by the second oscillatable member to where its hook portion will be disposed adjacent the top surface of the second oscillatable member and whereby its roller will be engaged by the lower surface of the second oscillatable member to lock the tine frame in such position so that its tines will be held in inoperative or raised position.

2. An improvement in a hay rake having a main frame and a ground wheel on each side of the main frame and having a tine frame rotatably mounted in the main frame and with clutch means between the ground wheels and the tine frame for intermittently imparting rotation to the tine frame, said clutch means comprising a disk having an annular portion provided with internal teeth and a finger or dog for engaging the internal teeth and having tension means normally tending to engage the dog with the internal teeth to lock the tine frame to the ground wheels to cause rotation of the tine frame, said improvement comprising manually operable means for engaging a portion of the clutch means to move the dog out of engagement with the internal teeth to de-clutch the tine frame from the ground wheels, locking means carried by the tine frame for engaging opposite sides simultaneously of the means for declutching the tine frame from the driving portion of the clutch for preventing relative movement of the tine frame in either direction, and means disposed into the path of the clutch means for de-clutching the tine frame from the internal teeth of the disk when the tines are in elevated position and means for engaging the locking means to prevent rotation of the tine frame in either direction.

3. An improvement in a hay rake having a main frame provided with a ground wheel on each side thereof and a clutch mechanism disposed at each side thereof and one half of which is driven by the ground wheel associated therewith and having a tine frame disposed between the clutch mechanism and a portion of the clutch mechanism being carried by each end of the tine frame, the improvement comprising movable means adapted normally to be held in the path of the clutching mechanism to de-clutch the tine frame from the other portion of the clutch driven by the ground wheels and said portion of the clutch carried by the tine frame having a pair of locking means thereon for engaging opposed surfaces of the means for de-clutching that portion of the clutch carried by the tine frame from that portion carried by the ground wheels for locking the tine frame against movement in either direction, and additional means carried by the main frame and adapted to be moved into the path of the clutch mechanism carried by the tine frame for de-clutching the tine frame from the portion of the clutch driven by the ground wheel at a time when the locking means will engage both sides of the second-named means for locking the tine frame in elevated or transport position.

4. An improvement in a hay rake having a main frame and ground wheels mounted on each side of the main frame and having a rotatable tine frame disposed transversely thereof, and having a clutch mechanism disposed at each side of the main frame and divided into two parts, one half of which is driven by the ground wheel associated therewith and the other half of which is mounted on the tine frame, the improvement comprising means normally tending to hold the clutching mechanism in clutching position to cause rotation of the tine frame, oscillatable means controlled by an operator for movement into and out of the path of the clutching mechanism carried by the tine frame to de-clutch the tine frame from the main frame and locking means carried by the portion of the clutch on each end of the tine frame for engaging opposite sides of the movable means for locking the tine frame against rotation in either direction while it is held in de-clutched position relative to that portion of the clutch driven by the ground wheels, and a second manually operable oscillatable means movable into the path of the clutching means carried by the tine frame for also de-clutching the portion of the clutching means carried by the tine frame from that portion driven by the ground wheel, and said second oscillatable means being engageable by the pair of means carried by the clutching mechanism on the tine frame for engaging both the upper and lower sides of the second movable means for holding the tines in elevated position and preventing rotation of the tine frame in either direction for transport purposes.

NOAH H. GODLEY.

REFERENCES CITED

The following references are of record in the file of this patent:

UNITED STATES PATENTS

| Number | Name | Date |
|---|---|---|
| 726,606 | Wilson | Apr. 28, 1903 |
| 761,211 | Danner | May 31, 1904 |
| 1,477,382 | Pearson | Dec. 11, 1923 |
| 2,472,953 | Meyer | June 14, 1949 |